US012512257B2

(12) United States Patent
Arai et al.

(10) Patent No.: US 12,512,257 B2
(45) Date of Patent: Dec. 30, 2025

(54) INDUCTOR AND METHOD FOR MANUFACTURING INDUCTOR

(71) Applicant: Murata Manufacturing Co., Ltd., Kyoto-fu (JP)

(72) Inventors: Takumi Arai, Nagaokakyo (JP); Motoki Toyama, Nagaokakyo (JP); Hiroyasu Mori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 891 days.

(21) Appl. No.: 17/656,449

(22) Filed: Mar. 25, 2022

(65) Prior Publication Data

US 2022/0310309 A1 Sep. 29, 2022

(30) Foreign Application Priority Data

Mar. 26, 2021 (JP) ................................ 2021-054173

(51) Int. Cl.

*H01F 27/29* (2006.01)
*H01F 17/04* (2006.01)
*H01F 27/28* (2006.01)
*H01F 41/02* (2006.01)

(52) U.S. Cl.

CPC ........... *H01F 27/292* (2013.01); *H01F 17/04* (2013.01); *H01F 27/2828* (2013.01); *H01F 41/0246* (2013.01); *H01F 2017/048* (2013.01)

(58) Field of Classification Search

CPC .... H01F 27/292; H01F 17/04; H01F 27/2828; H01F 41/0246; H01F 2017/048
See application file for complete search history.

(56) References Cited

U.S. PATENT DOCUMENTS 6,106,893 A * 8/2000 Uchikoba ............... H01F 17/06 427/407.1
2007/0109087 A1* 5/2007 Kawarai ................. H01F 17/04 336/200
2008/0012674 A1* 1/2008 Sano .................... H05K 1/0233 336/83
2017/0178797 A1* 6/2017 Todorov .............. H01F 27/2847
2019/0272945 A1* 9/2019 Arai ........................ H01F 27/28
(Continued)

FOREIGN PATENT DOCUMENTS

DE 3908896 A1 * 9/1989 ........... H01F 27/292
JP 2019-153642 A 9/2019

*Primary Examiner* — Malcolm Barnes
(74) *Attorney, Agent, or Firm* — Studebaker Brackett PLLC

(57) ABSTRACT

An inductor includes a core containing magnetic powder and a conductor embedded in the core. The core includes a mounting surface facing a mounting substrate side at the time of mounting, a pair of end surfaces orthogonal to the mounting surface, a pair of side surfaces orthogonal to the mounting surface and the pair of end surfaces. The conductor has a plate shape and includes a conductive wire portion extending inside the core over the end surfaces and a pair of electrode portions provided at both end portions of the conductive wire portion and extending from the end surface of the core to the mounting surface. The conductive wire portion includes a belt-shaped flat plate portion. One surface of the electrode portion facing the core is embedded in the core, and the other surface of the electrode portion facing the one surface is exposed from the core.

6 Claims, 16 Drawing Sheets

(56) References Cited

U.S. PATENT DOCUMENTS

| | | | | |
|---|---|---|---|---|
| 2020/0265991 | A1* | 8/2020 | Furukawa | H01F 27/324 |
| 2020/0388431 | A1* | 12/2020 | Oki | H01F 27/292 |
| 2021/0020356 | A1* | 1/2021 | Oka | H01F 27/29 |
| 2021/0375519 | A1* | 12/2021 | Wang | H01F 27/292 |

* cited by examiner

INDUCTOR AND METHOD FOR MANUFACTURING INDUCTOR

CROSS-REFERENCE TO RELATED APPLICATION

This application claims benefit of priority to Japanese Patent Application No. 2021-054173, filed Mar. 26, 2021, the entire content of which is incorporated herein by reference.

BACKGROUND

Technical Field

The present disclosure relates to an inductor and a method for manufacturing an inductor.

Background Art

In a conventional electronic component in which a lead led out from a metal plate embedded in a core as a molded body is bent to form an external terminal, plating is applied to a lead portion in order to improve solder wettability.

Japanese Patent Application Laid-Open No. 2019-153642 describes an inductor formed of a metal plate and a molded body including a portion of the metal plate. The metal plate includes a first metal plate portion embedded in the molded body and a second metal plate portion extending from the first metal plate portion to an outside of the molded body. The second metal plate portion is bent along a side surface of the molded body and a substrate mounting surface to form an external terminal.

SUMMARY

However, in the above-described related art, after the metal plate is embedded in the molded body, the external terminal is formed by bending the lead, which is a portion of the metal plate led out from the molded body, to the substrate mounting surface of the molded body. Therefore, it is necessary to form the molded body thin by at least the thickness of the lead with respect to a component height of the inductor, and the inductance and the DC superimposed current that can be realized can be limited to be small.

In addition, the force applied to the lead at the time of bending the lead increases according to the width of the lead, and mechanical damage such as cracks and chips may be generated in the molded body. Therefore, from the viewpoint of avoiding occurrence of mechanical damage in the molded body, the width of the lead that can be practically used is limited, and as a result, this lead width may be a limiting factor in reducing a DC resistance value of the inductor.

Accordingly, the present disclosure provides a configuration capable of realizing larger inductance and DC superimposed current while further suppressing a DC resistance value to a smaller value under a limitation of a required component size in an inductor configured by a metal plate embedded in a core.

According to an aspect of the present disclosure, there is provided an inductor including: a core containing magnetic powder; and a conductor embedded in the core. The core includes a mounting surface facing a mounting substrate side at a time of mounting, a pair of end surfaces orthogonal to the mounting surface, and a pair of side surfaces orthogonal to the mounting surface and the pair of end surfaces. The conductor has a plate shape and includes a conductive wire portion extending inside the core over the pair of end surfaces and a pair of electrode portions provided at both end portions of the conductive wire portion and extending from the end surface of the core to the mounting surface. The conductive wire portion includes a belt-shaped flat plate portion, and one surface of the electrode portion facing the core is embedded in the core, and the other surface of the electrode portion facing the one surface is exposed from the core.

According to another aspect of the present disclosure, there is provided a method for manufacturing an inductor including a core containing magnetic powder and a conductor embedded in the core. The method includes a process of forming the conductor by bending a conductive plate; and a process of embedding the conductor in the core such that a portion of the conductor is exposed from the core after the forming process of the conductor. The core includes a mounting surface facing a mounting substrate side at a time of mounting, a pair of end surfaces orthogonal to the mounting surface, and a pair of side surfaces orthogonal to the mounting surface and the pair of end surfaces. The conductor has a plate shape and includes a conductive wire portion extending inside the core over the pair of end surfaces in a state of being embedded in the core and a pair of electrode portions provided at both end portions of the conductive wire portion and extending from the end surface of the core to the mounting surface. The conductive wire portion includes a belt-shaped flat plate portion. In a state of being embedded in the core, one surface of the electrode portion facing the core is embedded in the core, and the other surface of the electrode portion facing the one surface is exposed from the core.

According to the present disclosure, in the inductor including the metal plate embedded in the core, it is possible to realize a configuration capable of realizing larger inductance and DC superimposed current while suppressing a DC resistance value to a smaller value under the limitation of a required component size.

DETAILED DESCRIPTION

Hereinafter, embodiments of the present disclosure will be described with reference to the drawings.

Figure 1:
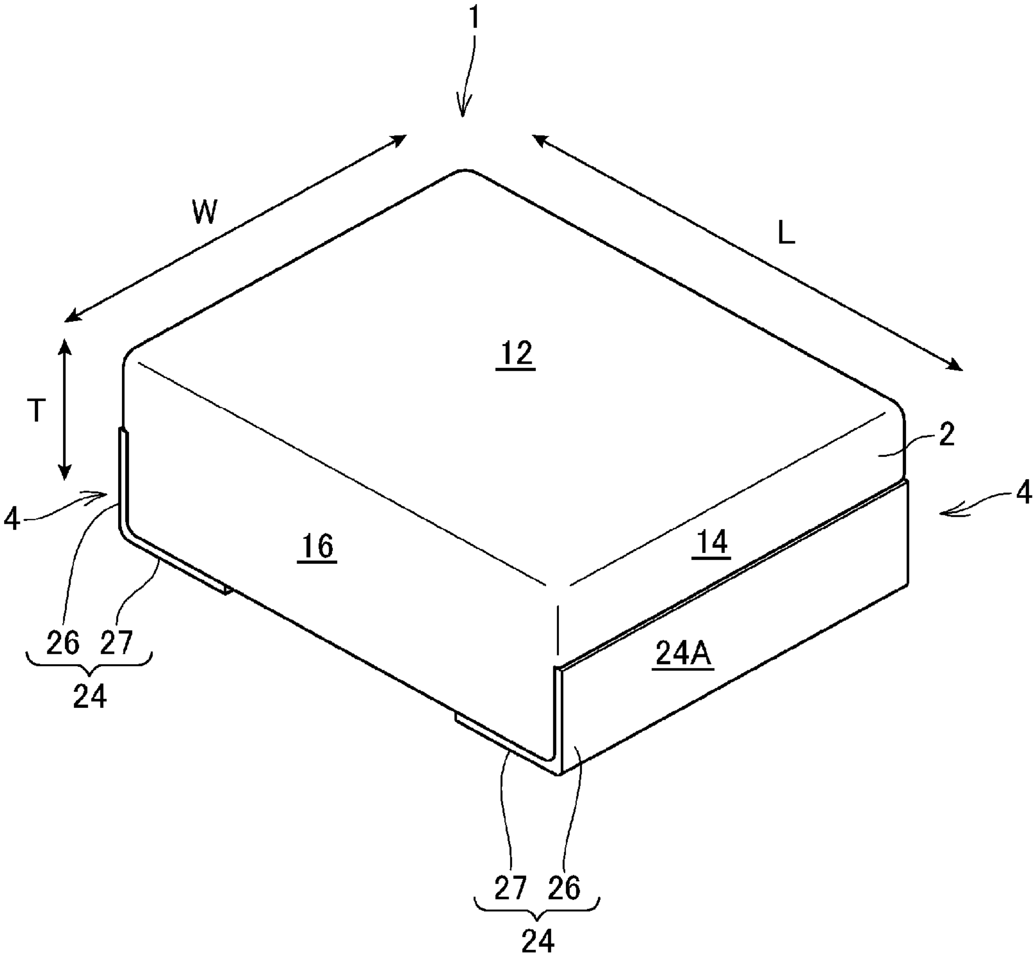
FIG. 1 is a perspective view when an inductor according to an embodiment of the present disclosure is viewed from an upper surface side.
Figure 2:
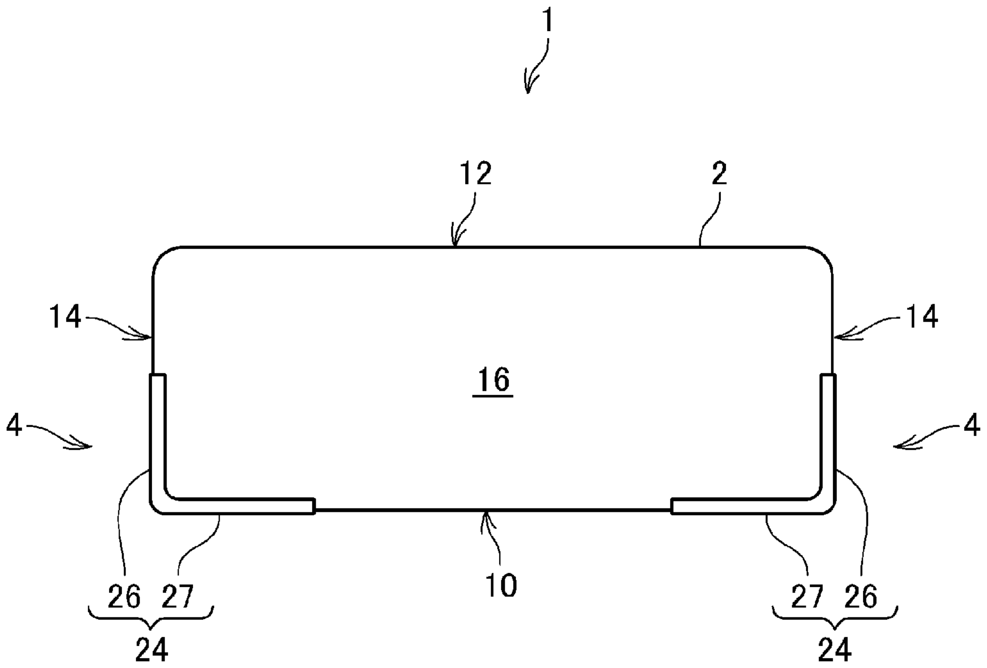
FIG. 2 is a plan view of a side surface of the inductor.
Figure 3:
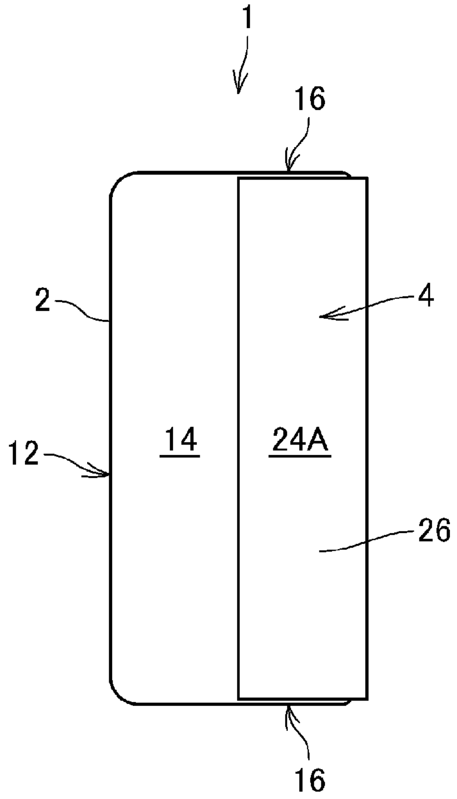
FIG. 3 is a plan view of an end surface of the inductor.
Figure 4:
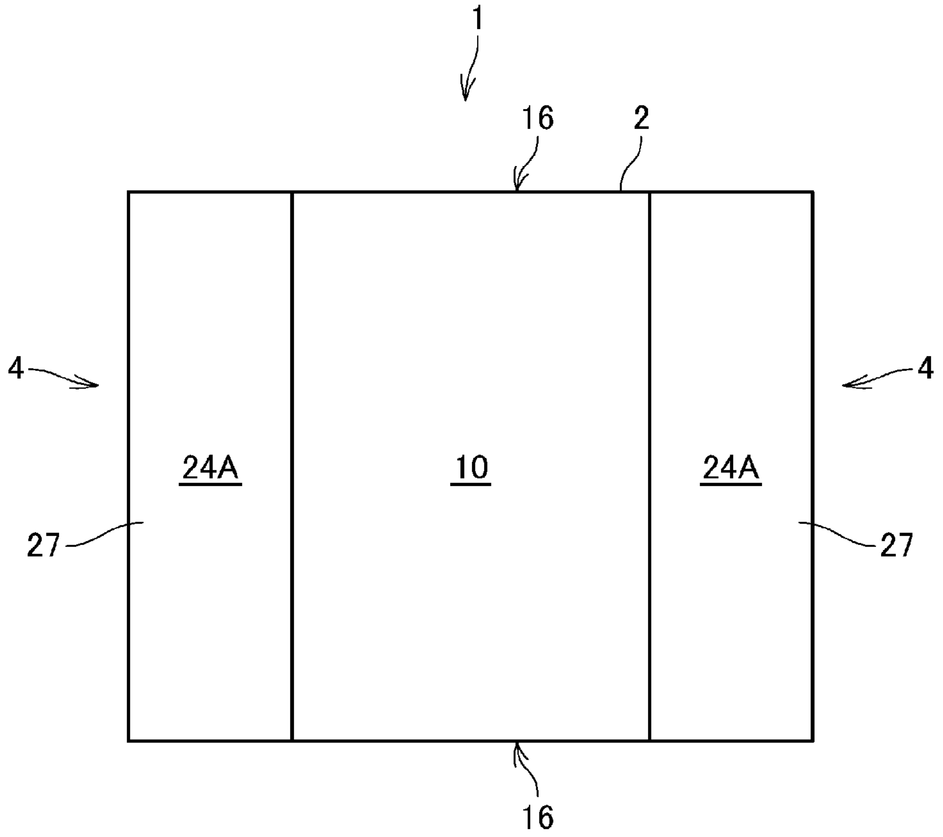
FIG. 4 is a plan view of a mounting surface of the inductor.

FIG. 1 is a perspective view when an inductor 1 according to the present embodiment is viewed from an upper surface 12 side. FIG. 2 is a plan view of a side surface 16 of the inductor 1, FIG. 3 is a plan view of an end surface 14 of the inductor 1, and FIG. 4 is a plan view of a mounting surface 10 of the inductor 1.

The inductor 1 of the present embodiment is configured as a surface mount electronic component, and includes an element body 2 having a substantially rectangular parallelepiped shape and a pair of external electrodes 4 provided on the surface of the element body 2.

Hereinafter, in the element body 2, a surface facing a mounting substrate (not illustrated) at the time of mounting is defined as a mounting surface 10 (FIG. 4), a surface facing the mounting surface 10 is referred to as an upper surface 12, a pair of surfaces orthogonal to the mounting surface 10 is referred to as end surfaces 14, and a pair of surfaces orthogonal to the mounting surface 10 and the pair of end surfaces 14 is referred to as side surfaces 16.

As illustrated in FIG. 1, a distance from the mounting surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2.

Figure 5:
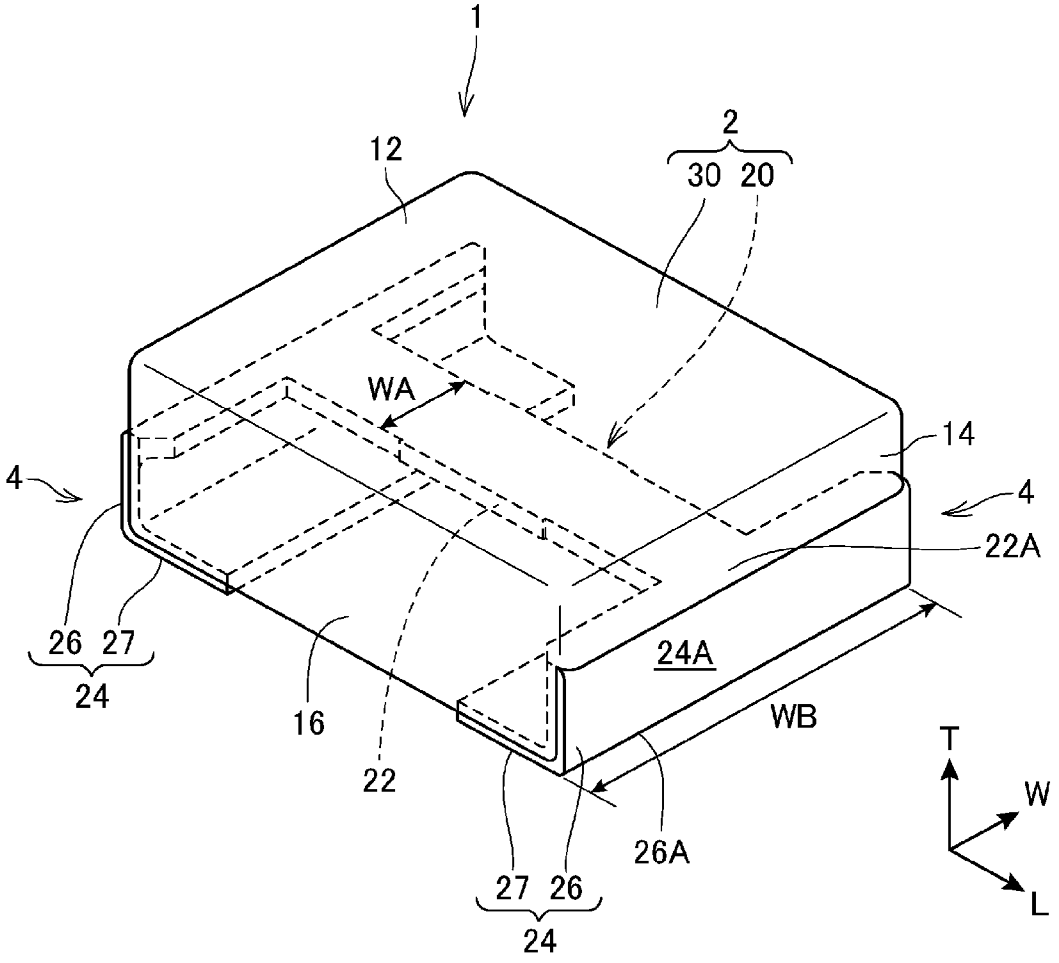
FIG. 5 is a perspective view illustrating an internal configuration of the inductor.

FIG. 5 is a perspective view illustrating an internal configuration of the inductor 1.

The element body 2 includes a conductor 20 and a core 30 having a substantially rectangular shape in which the conductor 20 is embedded, and is configured as a conductor-sealed magnetic component in which the conductor 20 is sealed in the core 30.

The core 30 is a molded body obtained by compression-molding a mixed powder obtained by mixing a magnetic powder and a resin into a substantially rectangular parallelepiped shape by pressurizing and heating the mixed powder in a state where the conductor 20 is incorporated in the core. There is an oxide insulating film oxidized more than the inside of the core 30 on the surface of the core 30. In the mixed powder of the present embodiment, barium sulfate is mixed as a lubricant in addition to the magnetic powder and the resin.

The mixed powder of the present embodiment has a resin amount of about 3.1 wt % with respect to the magnetic powder.

In addition, the magnetic powder of the present embodiment includes particles having two types of particle sizes, that is, large first magnetic particles having a relatively large average particle diameter and small second magnetic particles having a relatively small average particle diameter. During the compression molding, the small second magnetic particles enter between the large first magnetic particles together with the resin, so that a filling factor of the core 30 can increase, and magnetic permeability can also increase.

Here, a compounding ratio (weight ratio) of the first magnetic particles and the second magnetic particles is 70:30 to 85:15, preferably 70:30 to 80:20, and 75:25 in the present embodiment.

In addition, a ratio of the average particle diameter of the first magnetic particles to the average particle diameter of the second magnetic particles is preferably 5.0 or more.

Note that the magnetic powder may include particles having an average particle diameter between the average particle diameters of the first magnetic particles and the second magnetic particles, and thus, includes particles having three or more kinds of particle sizes.

In the present embodiment, each of the first magnetic particles and the second magnetic particles is a particle having a metal particle and an insulating film covering the surface the metal particle, the metal particle is made of Fe—Si-based amorphous alloy powder, and the insulating film is made of zinc phosphate. By covering the metal particles with the insulating film, insulating resistance and withstand voltage increase.

In the first magnetic particles, Cr-less Fe—C—Si alloy powder, Fe—Ni—Al alloy powder, Fe—Cr—Al alloy powder, Fe—Si—Al alloy powder, Fe—Ni alloy powder, and Fe—Ni—Mo alloy powder may be used as the metal particles.

In the first magnetic particles and the second magnetic particles, another phosphate (magnesium phosphate, calcium phosphate, manganese phosphate, cadmium phosphate, or the like) or a resin material (silicone-based resin, epoxy-based resin, phenol-based resin, polyamide-based resin, polyimide-based resin, polyphenylene sulfide-based resin, and the like) may be used for the insulating film.

In the mixed powder of the present embodiment, an epoxy resin containing a bisphenol A type epoxy resin as a main agent is used as a material of the resin.

The epoxy resin may be a phenol novolak-type epoxy resin.

The material of the resin may be other than the epoxy resin, and may be two or more kinds instead of one kind. For example, as the material of the resin, a thermosetting resin such as a phenol resin, a polyester resin, a polyimide resin, or a polyolefin resin can be used in addition to the epoxy resin.

As illustrated in FIG. 5, the conductor 20 includes a conductive wire portion 22 extending inside the core 30 over the pair of end surfaces 14, and an electrode portion 24 integrally formed at both ends of the conductive wire portion 22.

A surface 24A of the electrode portion 24 is exposed from each of the end surface 14 of the core 30 and the mounting surface 10, and nickel (Ni) plating and tin (Sn) plating are sequentially applied to the surfaces 24A to form the external electrode 4 in order to secure mountability. Then, the external electrode 4 formed on the mounting surface 10 is electrically connected to a wire of a circuit board by appropriate mounting means such as solder.

In the present embodiment, as illustrated in FIGS. 1 to 5, the electrode portion 24 of the conductor 20 is embedded in the core 30 in a state where only the surface 24A is substantially exposed on the mounting surface 10 and the end surface 14, and thus, an amount of protrusion of the electrode portion 24 from the core 30 is suppressed. As a result, since it is hardly necessary to consider the protrusion of the electrode portion 24, the core 30 can be made as large as a specified size of the inductor 1, and the inductor 1 having a small size and a low height but high performance can be realized.

When a length of the conductive wire portion 22 in the direction of the width W of the core 30 is defined as a conductive wire portion width WA and a length of the electrode portion 24 is defined as an electrode width WB, as illustrated in FIG. 5, the electrode width WB of the electrode portion 24 of the present embodiment is wider than the conductive wire portion width WA, and the resistance in DC resistance is reduced.

The electrode portion 24 is formed in a substantially L shape in an LT cut surface on an LT plane including the respective directions of a length L and a thickness T of the core 30.

Specifically, the electrode portion 24 includes a first electrode portion 26 that extends while being bent substantially vertically at the end portion 22A of the conductive wire portion 22 and a second electrode portion 27 that extends while being bent substantially vertically at a lower end portion 26A of the first electrode portion 26, and the first electrode portion 26 and the second electrode portion 27 form an L shape. The surfaces 24A of the first electrode portion 26 and the second electrode portion 27 are exposed from the end surface 14 and the mounting surface 10 of the core 30 to constitute the external electrode 4.

According to the electrode portion 24, as compared with a case where the conductive wire portion 22 and the electrode portion 24 (external electrode 4) are configured separately, since there is no joint surface between the conductive wire portion 22 and the electrode portion 24 (external electrode 4) which are low electrical resistance regions where a current mainly flows in the external electrode 4, a resistance value can be suppressed, and a large current can flow.

Furthermore, the conductor 20 of the present embodiment is formed of tough pitch copper, and allows a larger current to flow.

Based on the above configuration, the inductor 1 according to the present embodiment has an inductance value of about 10 nH or more in a size of about 2.5 mm in length L, about 2.0 mm in width W, and about 1.0 mm in thickness T, and is capable of achieving performance of about 0.85 mΩ or less in DC resistance, 15 A or more in rated current for temperature rise (when the temperature rises by 40° C.), and 15 A or more in DC superposed current (when the frequency is 1 MHz).

The inductor 1 is used as a power supply circuit including a charge pump type DC-DC converter that boosts a voltage by a capacitor and a switch and an LC filter, and an impedance matching coil (matching coil) of a high frequency circuit, and is used for electronic devices such as a personal computer, a DVD player, a digital camera, a TV, a mobile phone, a smartphone, car electronics, and medical/industrial machines. However, the application of the inductor 1 is not limited thereto, and the inductor 1 can also be used for, for example, a tuning circuit, a filter circuit, a rectifying and smoothing circuit, and the like.

In the inductor 1, an element-body protective layer may be formed on the entire surface of the element body 2 excluding the range of the external electrode 4. As a material of the element-body protective layer, for example, a thermosetting resin such as an epoxy resin, a polyimide resin, or a phenol resin, or a thermoplastic resin such as a polyethylene resin or a polyamide resin can be used. These resins may further contain a filler containing silicon oxide, titanium oxide, or the like.

Figure 6:
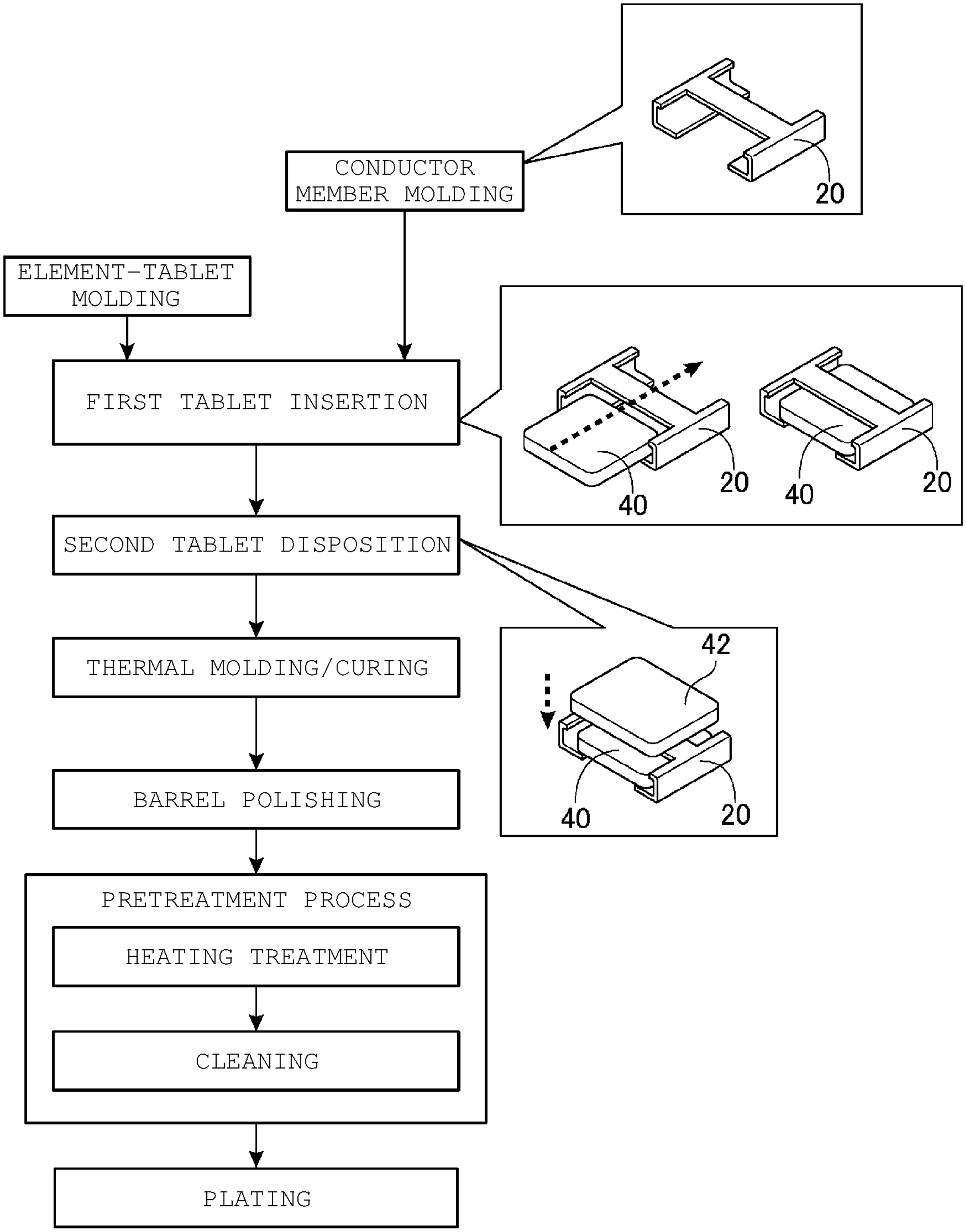
FIG. 6 is a schematic view of a manufacturing process of the inductor.

FIG. 6 is a schematic diagram of a manufacturing process of the inductor 1.

As illustrated in the drawing, the manufacturing process of the inductor 1 includes a conductor member molding process, an element-body tablet molding process, a first tablet inserting process, a second tablet disposing process, a thermal molding/curing process, a barrel polishing process, a pretreatment process, and a plating process.

The conductor member molding process is a process of molding the conductor 20.

In the present embodiment, first, a copper piece having a predetermined shape is formed by punching a copper plate having a predetermined thickness, and then the conductor 20 is formed by bending the copper piece. In this case, the first electrode portion 26 and the second electrode portion 27 of the electrode portion 24 are also bent. That is, by this conductor member molding process, the conductor 20 is formed which integrally includes the conductive wire portion 22 and the electrode portion 24 and in which the first electrode portion 26 and the second electrode portion 27 of the electrode portion 24 are also molded in advance (that is, preformed) before being embedded in the core 30.

The tablet molding process is a process of molding two preform bodies of a first tablet 40 and a second tablet 42.

The preform body is molded into a solid state which is easy to handle by pressurizing the mixed powder which is a material of the element body 2. Each of the first tablet 40 and the second tablet 42 is a preform body disposed on a lower side and an upper side of the conductive wire portion 22 of the conductor 20, and is molded in a substantially plate shape.

The first tablet inserting process is a process of inserting the first tablet 40 between the pair of electrode portions 24 on the lower side of the conductive wire portion 22 of the conductor 20 after setting the conductor 20 in a molding die. More specifically, the conductor 20 is provided with the electrode portion 24 having an L shape in the LT section at both end portions 22A of the conductive wire portion 22, and thus, the LT section has a substantially C shape, and the first tablet 40 is inserted into a space surrounded by the conductive wire portion 22 and the pair of electrode portions 24.

The second tablet disposing process is a process of placing the second tablet 42 on the conductive wire portion 22 of the conductor 20.

In the thermal molding/curing process, the first tablet 40, the conductor 20, and the second tablet 42 are integrated by applying heat to the first tablet 40 and the second tablet 42 set in the molding die while pressurizing the first tablet 40 and the second tablet 42 in an overlapping direction of the first tablet 40 and the second tablet 42 and curing them. As a result, a molded body including the conductor 20 is molded.

As described above, since the first tablet 40 is molded in a state of being accommodated in the space surrounded by the conductive wire portion 22 and the pair of electrode portions 24, the conductive wire portion 22 is embedded in the molded body, and the molded body in which the surface of the electrode portion 24 including the first electrode portion 26 and the second electrode portion 27 is exposed to be substantially flush with the core 30 is obtained. In addition, since the first electrode portion 26 and the second electrode portion 27 of the electrode portion 24 are formed in the conductor member molding process in advance, processing for forming the first electrode portion 26 and the second electrode portion 27 is not required for the molded body after molding.

The barrel polishing process is a process of barrel polishing the molded body, and a corner portion of the molded body is rounded by the process.

In the pretreatment process, heating treatment and cleaning treatment are performed as surface treatment of the molded body for the next plating process. In the plating process, nickel (Ni) plating and tin (Sn) plating are sequentially applied to a surface 24A of the electrode portion 24 by barrel plating.

As illustrated in FIG. 5, the inductor 1 according to the present embodiment prepared as described above includes the substantially rectangular parallelepiped core 30 containing magnetic powder and the conductor 20 embedded in the core 30. The conductor 20 includes the conductive wire portion 22 included in the core 30 and the first electrode portion 26 that extends while being bent in the thickness direction of the conductive wire portion 22 at each of both ends of the conductive wire portion 22. In addition, the conductor 20 has the second electrode portion 27 that is bent and extends in the thickness direction of the first electrode portion 26 at an end of the first electrode portion 26 facing the conductive wire portion 22. The conductive wire portion 22 includes a flat plate portion having a band shape in plan view as viewed from the upper surface 12 side. One surface of the first electrode portion 26 and the second electrode portion 27 facing the core 30 is embedded in the core 30, and the other surface facing the one surface of the first electrode portion 26 and the second electrode portion 27, that is, the surface 24A is exposed from the core 30. Hereinafter, the "plan view" refers to plan view viewed from the upper surface 12 side.

Figure 7:
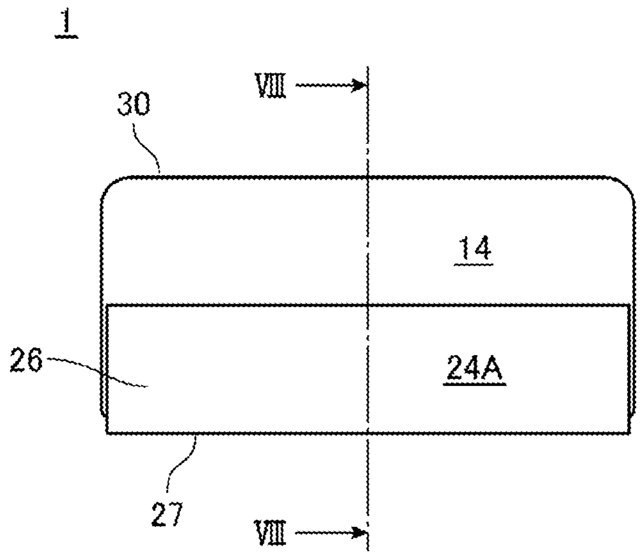
FIG. 7 is a plan view of an end surface of the inductor.
Figure 8:
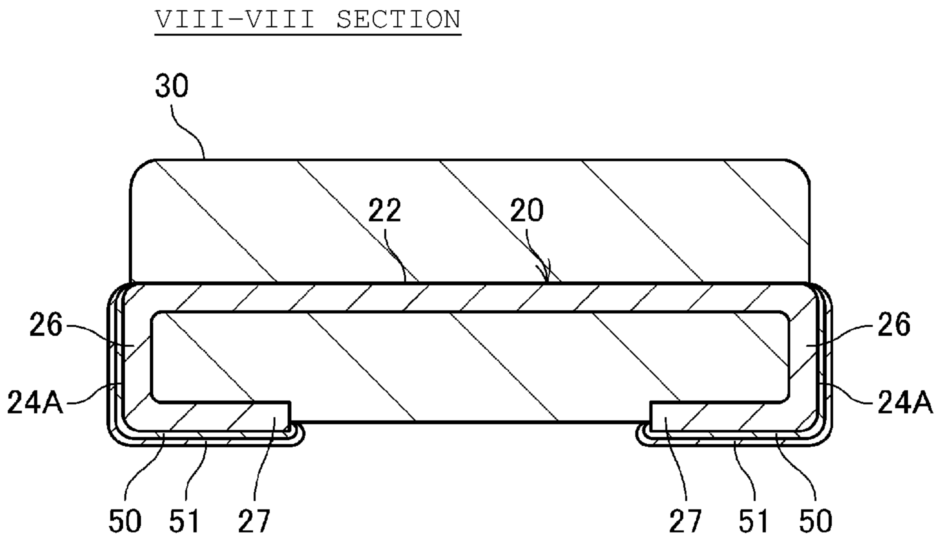
FIG. 8 is a sectional view of the inductor illustrated in FIG. 7 taken along line VIII-VIII.
Figure 9:
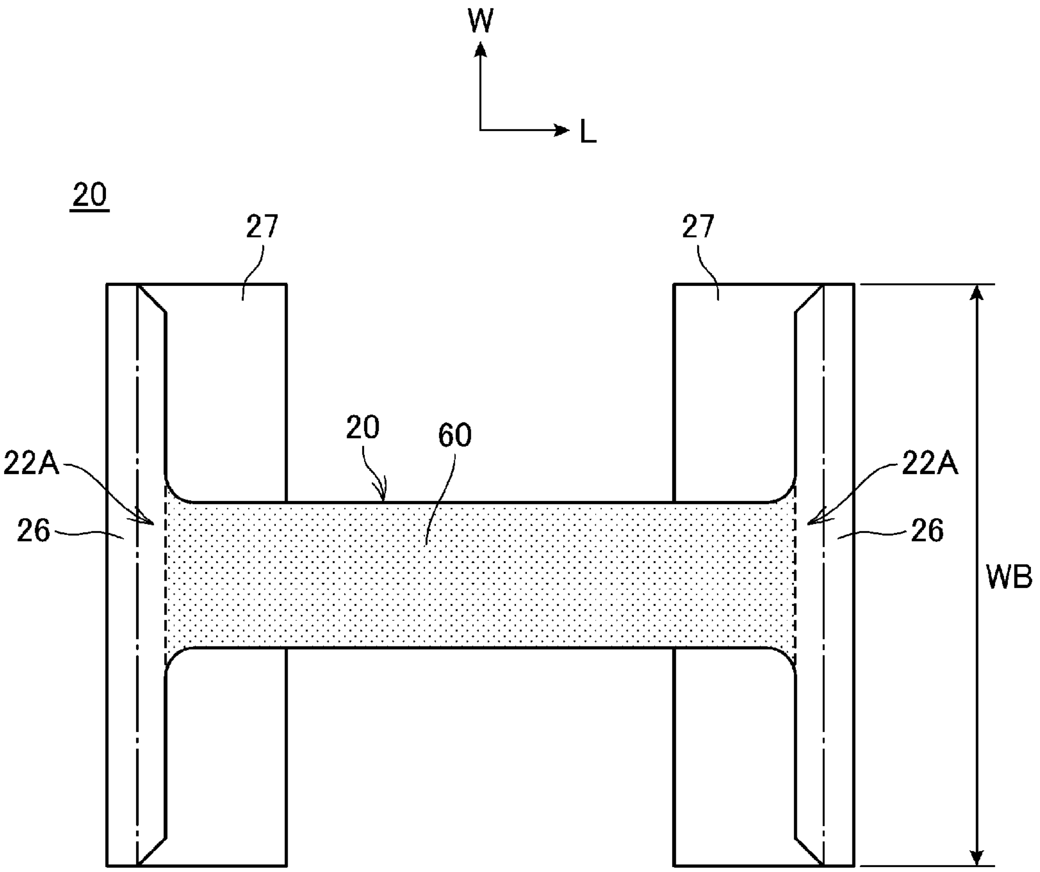
FIG. 9 is a diagram illustrating a configuration of a conductor illustrated in FIG. 5.

FIG. 8 is a sectional view of the inductor 1 illustrated in FIG. 7 taken along line VIII-VIII. Here, FIG. 7 is a plan view of the end surface 14 of the inductor 1 as in FIG. 3. FIG. 9 is a diagram illustrating the configuration of the conductor 20, and is a plan view of the conductor 20 as viewed from the upper surface 12 side of the inductor 1.

As illustrated in FIG. 8, the conductor 20 includes a conductive wire portion 22 included in the core 30, the first electrode portion 26 bent downward in the drawing at each of both ends of the conductive wire portion 22 and extending, and the second electrode portion 27 bent and extending in a right-left direction in the drawing at an end portion of the first electrode portion 26. As illustrated in FIG. 9, the conductive wire portion 22 includes a flat plate portion 60 (hatched portion in the drawing) having a band shape in plan view.

As illustrated in FIG. 8, one surface (surface facing surface 24A) of first electrode portion 26 and second electrode portion 27 facing core 30 is embedded in core 30. The surfaces 24A of the first electrode portion 26 and the second electrode portion 27 are exposed from the core 30, and the nickel plating layer 50 and the tin plating layer 51 are formed thereon.

In the inductor 1 having the above configuration, the conductor 20 formed by bending the conductive plate is embedded in the core 30, and a portion of the second electrode portion 27 constituting the conductor 20 facing the core 30 while facing the surface 24A exposed from the core 30 is embedded (or buried) in the core 30.

Such a configuration of the inductor 1 is realized by embedding the conductor 20 bent in advance in the core 30, and cannot be realized by bending the conductor 20 after embedding in the core 30 as in the related art. That is, in the inductor 1, mechanical damage of the core 30 due to bending of the conductor 20 embedded in the core 30 cannot occur. Further, in the inductor 1, in the conductor 20 which is bent in advance, the electrode widths WB of the first electrode portion 26 and the second electrode portion 27 can be secured wide in advance with the width W of the inductor 1 given by the required specifications of the inductor 1 as an upper limit, and thus, the DC resistance can be reduced as compared with the related art.

Furthermore, in the inductor 1, since the surface of the second electrode portion 27 facing the surface 24A is embedded in the core 30 as illustrated in FIG. 8, the mounting surface 10 and the surface 24A of the second electrode portion 27 can be configured to be substantially flush with each other, and the thickness of the core 30 can be made substantially the same thickness T with respect to the thickness T of the inductor 1 given from the required specifications of the inductor 1. That is, in the inductor 1, unlike the conventional case, it is not necessary to form the thickness of the core 30, which is a molded body, thinner than the thickness of the inductor 1 by the thickness of the second electrode portion 27. Therefore, in the inductor 1, since the volume of the magnetic particles surrounding the conductive wire portion 22 can be increased as compared with the conventional inductor, a larger inductance and a larger DC superposition current can be realized.

As described above, in the inductor 1, it is possible to realize larger inductance and DC superposition current while further suppressing the DC resistance value to a smaller value under the limitation of the required component size.

Here, in the present embodiment, the flat plate portion 60 forming the conductive wire portion 22 and having a band shape in plan view extends in a direction (that is, the L direction) orthogonal to the width direction of the first electrode portion 26 in plan view. However, the configuration of the flat plate portion constituting the conductive wire portion 22 is not limited thereto. The flat plate portion can be configured in any shape so as to have a desired length according to the inductance given from the required specifications of the inductor 1. As an example, the flat plate portion can be configured in any of the following shapes.

(a) The flat plate portion may include a belt-shaped portion extending at a predetermined angle with respect to the width direction (W direction) of the first electrode portion 26 in plan view.

(b) The flat plate portion may include a belt-shaped portion extending in the width direction (W direction) of the first electrode portion 26 and a belt-shaped portion extending in the direction (L direction) orthogonal to the width direction of the first electrode portion 26 in plan view.

(c) The flat plate portion may be configured to include a belt-shaped portion having a curved shape in plan view.

Hereinafter, a modification of the conductor 20 used in the inductor 1 will be described.

[First Modification]

Figure 10:
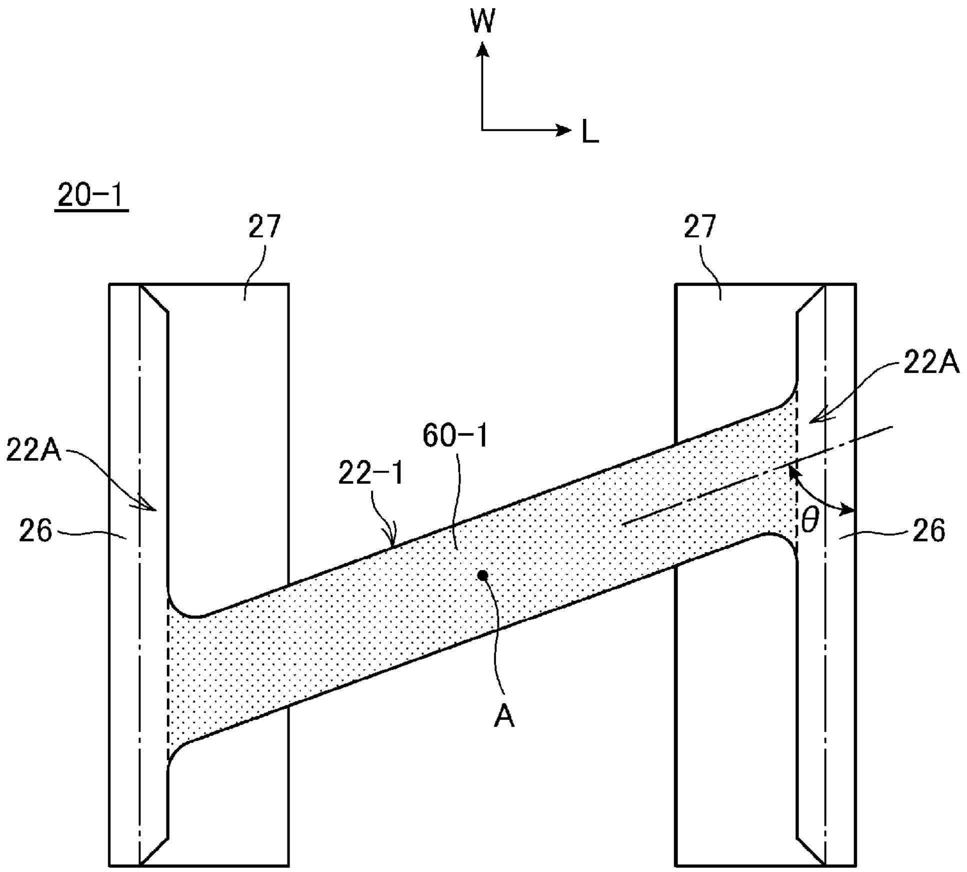
FIG. 10 is a diagram illustrating a configuration of a conductor according to a first modification.
Figure 11:
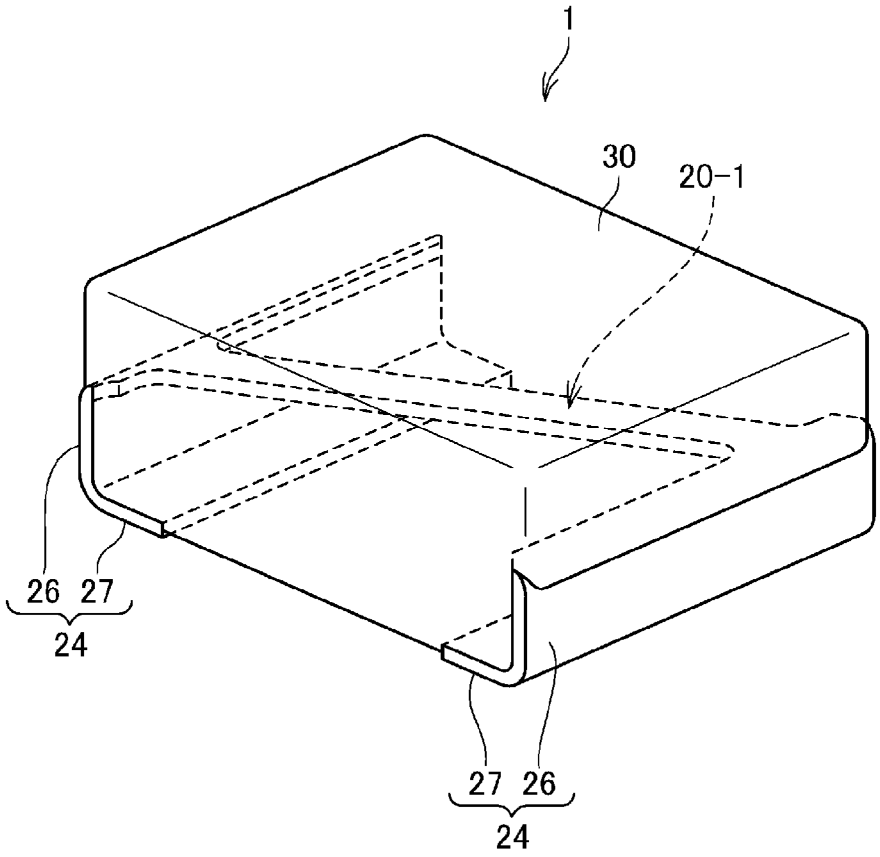
FIG. 11 is a perspective view of an inductor using the conductor illustrated in FIG. 10.

FIG. 10 is a diagram illustrating a configuration of a conductor 20-1 according to a first modification of the conductor 20, and is a plan view of the conductor 20-1 when viewed from the upper surface 12 side of the inductor 1. FIG. 11 is a perspective view illustrating an internal configuration of the inductor 1 when the conductor 20-1 is used. In FIGS. 10 and 11, the same components as those illustrated in FIGS. 9 and 5 are denoted by the same reference numerals as those in FIGS. 9 and 5, respectively, and the description of FIGS. 9 and 5 described above is incorporated.

The conductor 20-1 according to the present modification includes a conductive wire portion 22-1 including a flat plate portion 60-1 having the above-described configuration (a) instead of the conductive wire portion 22 including the flat plate portion 60. Specifically, as an example of the configuration of (a) described above, the flat plate portion 60-1 is configured as a linear belt-shaped portion extending at a predetermined angle θ with respect to the width direction (W direction) of the first electrode portion 26 in plan view, and has a rotationally symmetric shape with respect to a center point A. The center point A is, for example, a diagonal intersection of the substantially rectangular upper surface 12 of the inductor 1.

Since the flat plate portion 60-1 according to the present modification extends at the predetermined angle θ with respect to the width direction of the first electrode portion 26 in plan view, the length measured along the extension direction of the flat plate portion 60-1 in plan view is longer than the length of the flat plate portion 60. Therefore, by using the conductor 20-1, the inductance of the inductor 1 can be increased as compared with the case of using the conductor 20.

[Second Modification]

Figure 12:
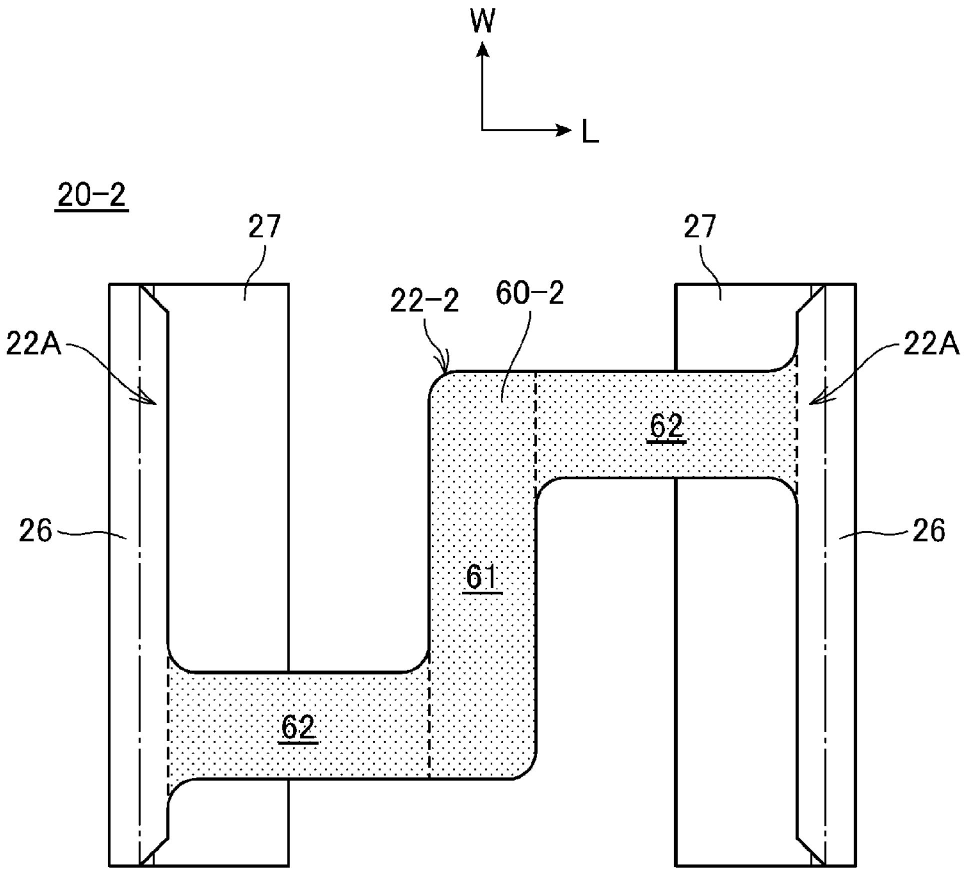
FIG. 12 is a diagram illustrating a configuration of a conductor according to a second modification.
Figure 13:
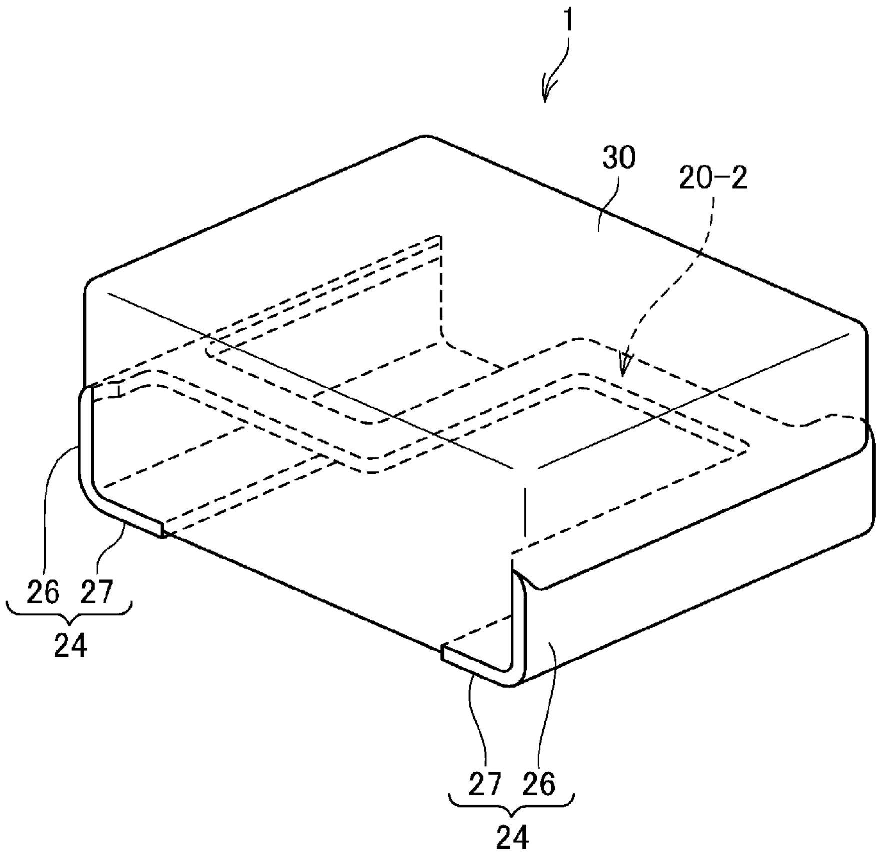
FIG. 13 is a perspective view of an inductor using the conductor illustrated in FIG. 12.

FIG. 12 is a diagram illustrating a configuration of a conductor 20-2 according to a second modification of the conductor 20, and is a plan view of the conductor 20-2 when viewed from the upper surface 12 side of the inductor 1. FIG. 13 is a perspective view illustrating an internal configuration of the inductor 1 when the conductor 20-2 is used. In FIGS. 12 and 13, the same components as those illustrated in FIGS. 9 and 5 are denoted by the same reference numerals as those in FIGS. 9 and 5, respectively, and the description of FIGS. 9 and 5 described above is incorporated.

The conductor 20-2 according to the present modification includes a conductive wire portion 22-2 including a flat plate portion 60-2 having the above-described configuration (b) instead of the conductive wire portion 22 including the flat plate portion 60. Specifically, the flat plate portion 60-2 includes one belt-shaped portion 61 extending in the width direction of the first electrode portion 26 and two belt-shaped portions 62 extending in a direction orthogonal to the width direction of the first electrode portion 26, and is configured to have a shape bent into a crank shape in plan view as a whole.

The flat plate portion 60-2 according to the present modification is configured to have a shape bent in a crank shape in plan view. Therefore, a length measured along the extension direction of the flat plate portion 60-2 in plan view is longer than lengths of the flat plate portion 60 and the flat plate portion 60-1. Therefore, by using the conductor 20-2, the inductance of the inductor 1 can be further increased as compared with the case of using the conductor 20 and the conductor 20-1.

[Third Modification]

Figure 14:
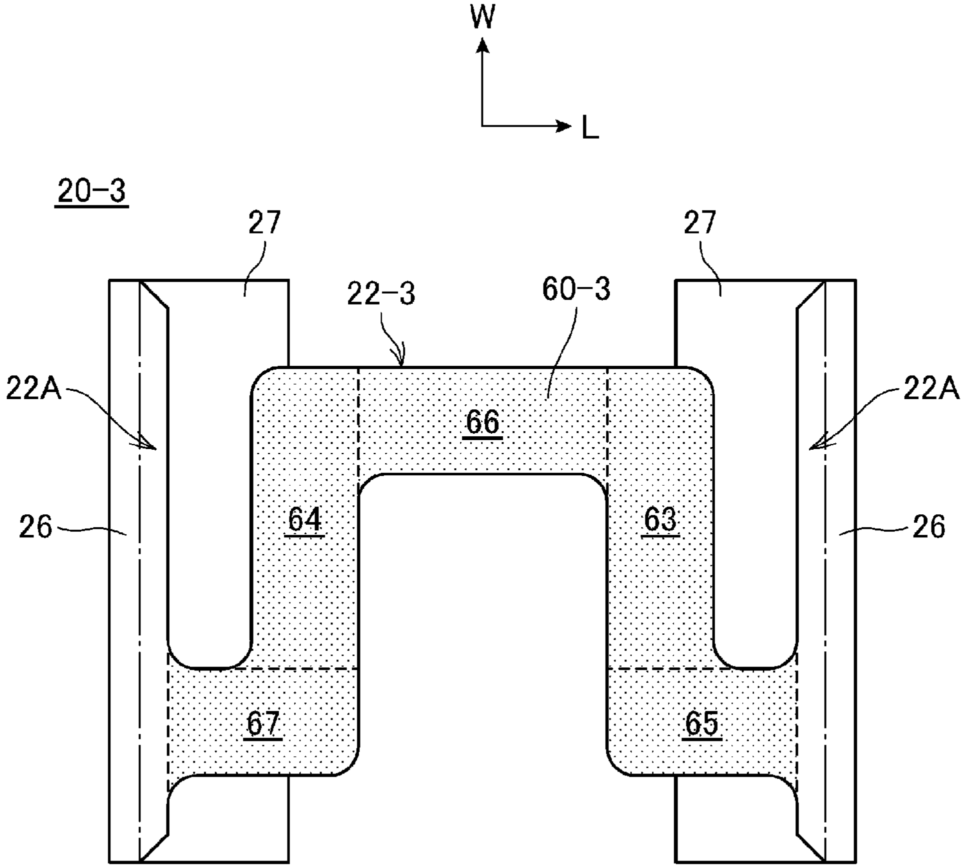
FIG. 14 is a diagram illustrating a configuration of a conductor according to a third modification.
Figure 15:
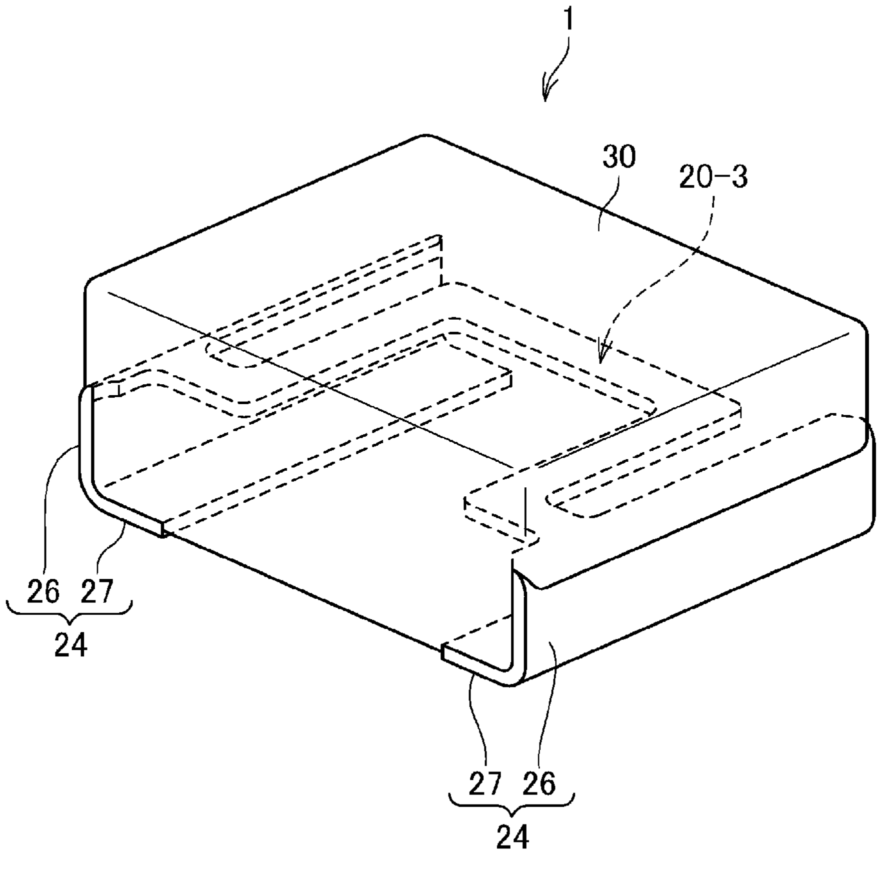
FIG. 15 is a perspective view of an inductor using the conductor illustrated in FIG. 14.

FIG. 14 is a diagram illustrating a configuration of a conductor 20-3 according to a third modification of the conductor 20, and is a plan view of the conductor 20-3 when viewed from the upper surface 12 side of the inductor 1. FIG. 15 is a perspective view illustrating an internal configuration of the inductor 1 when the conductor 20-3 is used. In FIGS. 14 and 15, the same components as those illustrated in FIGS. 9 and 5 are denoted by the same reference numerals as those in FIGS. 9 and 5, respectively, and the description of FIGS. 9 and 5 described above is incorporated.

The conductor 20-3 according to the present modification includes a conductive wire portion 22-3 including a flat plate portion 60-3 having the above-described configuration (b) instead of the conductive wire portion 22 including the flat plate portion 60. Specifically, the flat plate portion 60-3 includes two belt-shaped portions 63 and 64 extending in the width direction of the first electrode portion 26 and three belt-shaped portions 65, 66, and 67 extending in a direction orthogonal to the width direction of the first electrode portion 26, and is configured to have a substantially U-shaped bent shape as a whole in plan view.

The flat plate portion 60-3 according to the present modification is configured to have a shape bent in a U-shape in plan view. Therefore, the length measured along the extension direction of the flat plate portion 60-3 in plan view is longer than the lengths of the flat plate portions 60, 60-1, and 60-2. Therefore, by using the conductor 20-3, the inductance of the inductor 1 can be further increased as compared with the case of using the conductors 20, 20-1, and 20-2.

[Fourth Modification]

Figure 16:
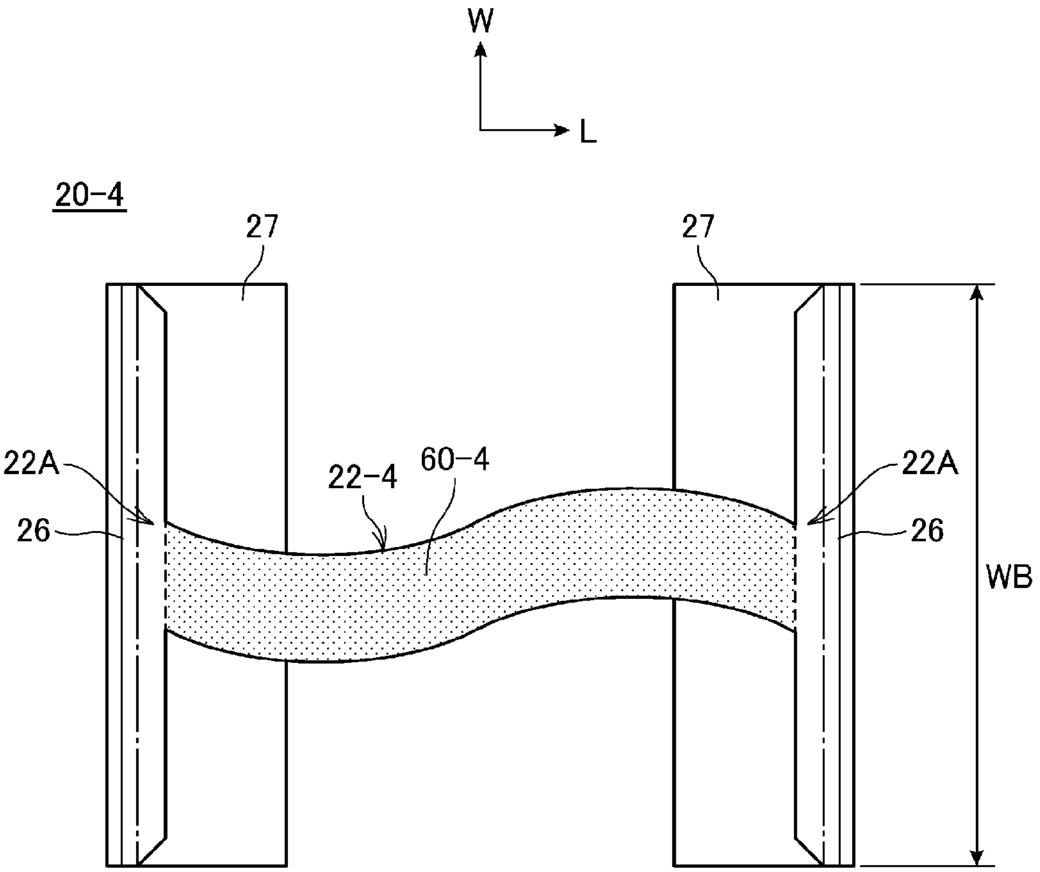
FIG. 16 is a diagram illustrating a configuration of a conductor according to a fourth modification.

FIG. 16 is a diagram illustrating a configuration of a conductor 20-4 according to a fourth modification of the conductor 20, and is a plan view of the conductor 20-4 when viewed from the upper surface 12 side of the inductor 1. In FIG. 16, the same components as those illustrated in FIG. 9 are denoted by the same reference numerals as those in FIG. 9, and the description of FIG. 9 is incorporated.

The conductor 20-4 according to the present modification includes a conductive wire portion 22-4 including a flat plate portion 60-4 having the configuration of (c) described above instead of the conductive wire portion 22 including the flat plate portion 60. Specifically, the flat plate portion 60-4 includes a curved belt-shaped portion and is formed in a substantially S-shape.

The flat plate portion 60-4 according to the present modification is configured to have a curved belt-shaped portion in plan view. Therefore, the length measured along the extension direction of the flat plate portion 60-4 is longer than the length of the flat plate portion 60. Therefore, by using the conductor 20-4, the inductance of the inductor 1 can be increased as compared with the case of using the conductor 20.

As described above, the inductor 1 according to the above-described embodiment includes the core 30 containing magnetic powder and the conductor 20 embedded in the core 30. The core 30 includes the mounting surface 10 facing the mounting substrate side at the time of mounting, the pair of end surfaces 14 orthogonal to the mounting surface 10, and the pair of side surfaces 16 orthogonal to the mounting surface 10 and the pair of end surfaces 14. In addition, the conductor 20 has a plate shape, and includes the conductive wire portion 22 extending inside the core 30 across the pair of end surfaces 14, and the pair of electrode portions provided at both end portions 22A of the conductive wire portion 22 and extending from the end surface of the core to the mounting surface. The conductive wire portion 22 includes the belt-shaped flat plate portion 60. One surface of the electrode portion 24 facing the core 30 is embedded in the core 30, and the surface 24A which is the other surface facing the one surface of the electrode portion 24 is exposed from the core 30.

According to this configuration, in the inductor 1 configured by the conductor 20 which is a metal plate embedded in the core 30, it is possible to realize larger inductance and DC superposition current while further suppressing the DC resistance value to a smaller value under the limitation of the required component size.

In addition, the flat plate portion 60 of the conductive wire portion 22 extends in the direction orthogonal to the end surface 14 of the core 30. According to this configuration, the conductor 20 can be configured in a simple shape.

In addition, the flat plate portion 60-1 of the conductive wire portion 22-1 of the conductor 20-1 according to the modification of the conductor 20 extends obliquely with respect to the direction orthogonal to the end surface 14 of the core 30. In addition, the flat plate portions 60-2 and 60-3 of the conductive wire portions 22-2 and 22-3 of the conductors 20-2 and 20-3 according to the modification of the conductor 20 include a belt-shaped portion 61 extending in the direction orthogonal to the side surface 16 of the core 30 and the belt-shaped portion 62 extending in a direction orthogonal to the end surface 14 of the core 30. As an example, the flat plate portion 60-2 has a shape bent in a crank shape. As another example, the flat plate portion 60-3 has a substantially U-shaped bent shape. In addition, the flat plate portion 60-4 of the conductive wire portion 22-4 of the conductor 20-4 according to the modification of the conductor 20 includes a curved belt-shaped portion 63. As an example, the flat plate portion 60-4 has a shape bent in an S shape.

According to these configurations, as compared with the case where the flat plate portion extends only in the direction orthogonal to the end surface 14 of the core 30, the length of the flat plate portion measured in the extension direction of the flat plate portion can be increased, and thus, the inductance of the inductor 1 can be increased.

The manufacturing method according to the present embodiment is a method for manufacturing the inductor 1 including the core 30 containing the magnetic powder and the conductor 20 embedded in the core 30. This manufacturing method includes a process of forming the conductor 20 by bending the conductive plate, and a process of embedding the conductor 20 in the core 30 such that a portion of the conductor 20 is exposed from the core 30 after the forming process. The core 30 includes the mounting surface 10 facing the mounting substrate side at the time of mounting, the pair of end surfaces 14 orthogonal to the mounting surface 10, and the pair of side surfaces 16 orthogonal to the mounting surface 10 and the pair of end surfaces 14. The conductor 20 has a plate shape, and includes the conductive wire portion 22 extending inside the core 30 over the pair of end surfaces 14 in a state of being embedded in the core 30, and the pair of electrode portions 24 provided at both end portions of the conductive wire portion 22 and extending from the end surface 14 of the core 30 to the mounting surface 10. The conductive wire portion includes the belt-shaped flat plate portion 60. In addition, in a state of being embedded in the core 30, one surface of the electrode portion 24 facing the core 30 is embedded in the core 30, and the surface 24A which is the other surface of the electrode portion 24 facing the one surface is exposed from the core 30.

According to this configuration, it is possible to manufacture the inductor 1 which includes the plate-shaped conductor 20 embedded in the core 30 and can realize larger inductance and DC superposition current while further suppressing the DC resistance value to a smaller value under the limitation of the required component size.

Note that the above-described embodiment is merely an example of one aspect of the present disclosure, and can be arbitrarily modified and applied without departing from the gist of the present disclosure.

The directions such as horizontal and vertical directions, various numerical values, shapes, and materials in the above-described embodiment includes a range (so-called equivalent range) in which the same functions and effects as those of the directions, numerical values, shapes, and materials are exhibited unless otherwise specified.

What is claimed is:

1. An inductor comprising:

a core containing magnetic powder; and a conductor embedded in the core, wherein the core includes a mounting surface facing a mounting substrate side at a time of mounting, a pair of end surfaces orthogonal to the mounting surface, a pair of side surfaces orthogonal to the mounting surface and the pair of end surfaces, the conductor has a plate shape and includes a conductive wire portion extending inside the core over the pair of end surfaces, and a pair of electrode portions, each of the electrode portions being at a respective one of end portions of the conductive wire portion and extending from a respective one of the end surfaces to the mounting surface of the core, the conductive wire portion includes a belt-shaped flat plate portion, for each of the electrode portions, one surface facing the core is embedded in the core and an other surface opposite to the one surface is exposed from the core, and the belt-shaped flat plate portion connects to the electrode portions via the end portions at locations further inward in the core from each of the side surfaces than opposite ends of the electrode portions that face the side surfaces, and the opposite ends of the electrode portions are closer to their respective side surfaces than any part of the conductive wire portion.

2. The inductor according to claim 1, wherein the flat plate portion of the conductive wire portion extends in a direction orthogonal to the end surfaces.

3. The inductor according to claim 1, wherein the flat plate portion extends obliquely with respect to a direction orthogonal to the end surfaces.

4. The inductor according to claim 1, wherein the flat plate portion includes a first belt-shaped portion extending in a direction orthogonal to the side surfaces and a second belt-shaped portion extending in a direction orthogonal to the end surfaces.

5. The inductor according to claim 1, wherein the flat plate portion includes a curved belt-shaped portion.

6. The inductor according to claim 1, wherein the electrode portions extend to each of the side surfaces.

* * * * *